United States Patent [19]
Fried

[11] 3,741,985
[45] June 26, 1973

[54] PHENYL-BENZODIOXANE DERIVATIVES
[75] Inventor: John H. Fried, Palo Alto, Calif.
[73] Assignee: Syntex Corporation, Panama, Panama
[22] Filed: Jan. 21, 1971
[21] Appl. No.: 108,609

[52] U.S. Cl. ....... 260/340.2, 260/340.3, 260/473 S, 260/520, 260/332.3 P, 260/999
[51] Int. Cl............................................ C07d 15/08
[58] Field of Search................................... 260/340.2

[56] References Cited
UNITED STATES PATENTS
3,420,830 1/1969 Fried............................... 260/340.2
3,503,993 3/1970 Blume............................. 260/340.2

Primary Examiner—Norma S. Milestone
Attorney—Evelyn K. Merker, Gerard A. Blaufarb and Lawrence S. Squires

[57] ABSTRACT

6-Phenyl-1,3-benzodioxan-4-one derivatives and 6-phenyl-1,3-benzodioxane derivatives and methods of preparing these compounds. The primary methods for preparing the aforementioned benzodioxane-ketone compounds are characterized by the step of treating the corresponding 2-hydroxy-5-phenyl benzoic acid derivative with an alkyl ortho-ester in the presence of an acid catalyst. The primary methods for preparing the 6-phenyl-1,3-benzodioxane derivatives are characterized by the step of treating the corresponding 2-hydroxy-5-phenyl benzyl alcohol with a ketone or aldehyde in the presence of an acid catalyst. The aforementioned phenyl-1,3-benzodioxan-4-one derivatives and 6-phenyl-1,3-benzodioxane derivatives have analgesic activity and thus are useful in the treatment of mammals wherein analgesics are indicated.

9 Claims, No Drawings

PHENYL-BENZODIOXANE DERIVATIVES

BACKGROUND OF THE INVENTION

1. The Invention

This invention relates to 6-phenyl-1,3-benzodioxane derivatives and to methods of preparing such derivatives. In a further aspect, this invention relates to 6-phenyl-1,3-benzodioxane derivatives and 6-phenyl-1,3-benzodioxan-4-one derivatives, substituted at the 2 and/or 4' positions and to methods of preparing such compounds. In a still further aspect this invention relates to 4'-halo derivatives of 6-phenyl-1,3-benzodioxane and 6-phenyl-1,3-benzodioxan-4-one derivatives which are further substituted at the 2-position, and to methods of preparing such compounds. In another aspect, this invention relates to means for carrying out the afore-mentioned methods and to methods and means for administering the aforementioned compounds of my invention.

2. The Prior Art

At the present time, one of the most widely used compounds for alleviating or mitigating pain and fever is acetylsalicylic acid, commonly known as aspirin. This compound has in normal dosage ranges a relatively low toxicity and a relatively low incidence of adverse side effects. There is, however, a tendency in some patients, even where normal dosage ranges are used, to develop indigestion, heartburn, and other forms of gastric irritation, and where higher dosage ranges are required, the gastric effect may be prohibitive, resulting, in some instances, in gastric hemorrhage. Accordingly, I have developed a new group of compounds having high analgesic and anti-pyretic activity, and also anti-inflammatory activity, but without the adverse gastric effect incident to aspirin.

Phenyl salicyclic acid compounds purported to have anti-inflammatory activity effective in the prevention and inhibition of edema and granuloma tissue formation, and further purported to have some degree of anti-pyretic and analgesic activity are also known to the art; see, for example, Canadian Patent Nos. 799,516 and 818,560.

SUMMARY

In summary, the compounds of my invention can be represented by the following generic formula:

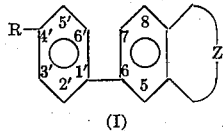

(I)

wherein R is H, lower alkyl, lower alkoxy, fluoro, chloro, bromo, iodo, or trifluoromethyl; and Z is the group

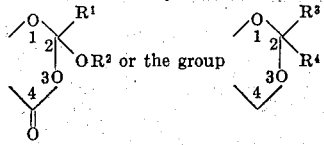

wherein $R^1$ is H or lower alkyl, $R^2$ is lower alkyl, $R^3$ is selected from the group consisting of H, lower alkyl and lower alkoxy; $R^4$ is selected from the group consisting of H and lower alkyl, or $R^3$ and $R^4$ together with the carbon atom to which they are joined form a cyclic alkyl group having from five through seven ring carbon atoms, or a saturated monocyclic monoheterocyclic group having five or six ring atoms and having only one non-carbon ring atom, which non-carbon ring atom is selected from the group consisting of oxygen and sulfur.

The 2-lower alkoxy compounds of my invention can, in summary, be prepared according to the methods of my invention by treating the corresponding 2-hydroxy-5-phenyl-benzoic acid or -benzyl alcohol derivatives with a suitable alkyl ortho-ester in the presence of an acid catalyst or with a lower alkoxy alkyne in the presence of a Lewis acid catalyst. The 6-phenyl-1,3-benzodioxane compounds of my invention can also, in summary, be prepared according to my invention by treating the corresponding 2-hydroxy-5-phenyl-benzoic acid derivatives with a suitable ketone, for example, acetone, or ketone-like compound, for example, 2,2-dimethoxypropane, in the presence of an acid catalyst or with an O-lower alkyl alkanoic acid lactonium tetrafluoroborate in the presence of a base.

The invention will be further described hereinbelow.

DETAILED DESCRIPTION OF THE INVENTION AND PREFERRED EMBODIMENTS

The compounds of my invention can be conveniently represented by the following subgeneric formulas:

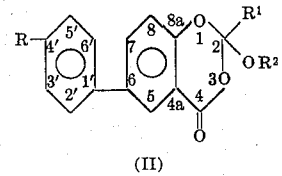

(II)

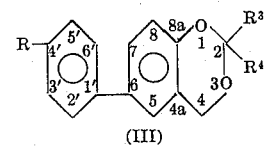

(III)

wherein R is H, lower alkyl, lower alkoxy, fluoro, chloro, bromo, iodo, or trifluoromethyl; $R^1$ is H or lower alkyl, $R^2$ is lower alkyl, $R^3$ is selected from the group consisting of H, lower alkyl, and lower alkoxy; $R^4$ is selected from the group consisting of H and lower alkyl or $R^3$ and $R^4$ together with the carbon atom to which they are joined form a cyclic alkyl group having from five through seven ring carbon atoms, or a saturated monocyclic monoheterocyclic group having 5 or 6 ring atoms containing only one non-carbon ring atom, said non-carbon ring atom being selected from the group consisting of oxygen and sulfur.

As used hereinabove and below, the following terms have the following meanings. The term lower alkyl refers to alkyl groups having from one through seven carbon atoms and includes both straight chained and branched chain alkyl groups. Typical lower alkyl groups thus include, for example, methyl, ethyl, propyl, isopropyl, butyl, isobutyl, pentyl, hexyl, and the like. The term lower alkoxy refers to alkoxy groups having from one through seven carbon atoms. Typical lower alkoxy groups include, for example, methoxy, ethoxy, isopropoxy, and the like. The term cyclic alkyl group refers to cyclic alkyls having from five to seven ring carbon atoms, which ring carbon atoms may be substituted or unsubstituted. Typical cyclic alkyl groups thus include, for example, cyclopentyl, cyclohexyl, cycloheptyl, chlorocyclohexyl, and the like. The term saturated monocyclic monoheterocyclic refers to saturated heterocyclic groups having only one ring and having only one non-carbon (i.e., monohetero) ring atom. Thus typical saturated monocyclic monoheterocyclic groups having five or six ring atoms, wherein said non-carbon atom is selected from the group consisting of oxygen and sulfur include, for example, tetrahydrofuran, tetrahydropyran, thiolane, and thiane.

Typical compounds of formula II, of my invention, include for example:

2-ethoxy-6-(4'-fluorophenyl)-1,3-benzodioxan-4-one;
6-(4'-chlorophenyl)-2-ethoxy-1,3-benzodioxan-4-one;
6-(4'-bromophenyl)-2-ethoxy-1,3-benzodioxan-4-one;
2-ethoxy-6-(4'-iodophenyl)-1,3-benzodioxan-4-one;
2-ethoxy-6-phenyl-1,3-benzodioxan-4-one;
2-ethoxy-6-(4'-trifluoromethylphenyl)-1,3-benzodioxan-4-one;
2-ethoxy-6-(4'-methylphenyl)-1,3-benzodioxan-4-one;
2-ethoxy-6-(4'-methoxyphenyl)-1,3-benzodioxan-4-one;
6-(4'-fluorophenyl)-2-methoxy-1,3-benzodioxan-4-one;
6-(4'-chlorophenyl)-2-methoxy-1,3-benzodioxan-4-one;
6-(4'-bromophenyl)-2-methoxy-1,3-benzodioxan-4-one;
6-(4'-iodophenyl)-2-methoxy-1,3-benzodioxan-4-one;
2-methoxy-6-phenyl-1,3-benzodioxan-4-one;
2-methoxy-6-(4'-trifluoromethylphenyl)-1,3-benzodioxan-4-one;
2-methoxy-6-(4'-methylphenyl)-1,3-benzodioxan-4-one;
2-methoxy-6-(4'-methoxyphenyl)-1,3-benzodioxan-4-one;
2-ethoxy-2-ethyl-6-(4'-fluorophenyl)-1,3-benzodioxan-4-one;
6-(4'-chlorophenyl)-2-ethoxy-2-ethyl-1,3-benzodioxan-4-one;
6-(4'-bromophenyl)-2-ethoxy-2-ethyl-1,3-benzodioxan-4-one;
2-ethoxy-2-ethyl-6-(4'-iodophenyl)-1,3-benzodioxan-4-one;
2-ethoxy-2-ethyl-6-phenyl-1,3-benzodioxan-4-one;
2-ethoxy-2-ethyl-6-(4'-trifluoromethylphenyl)-1,3-benzodioxan-4-one;
2-ethoxy-2-ethyl-6-(4'-methylphenyl)-1,3-benzodioxan-4-one;
2-ethoxy-2-ethyl-6-(4'-methoxyphenyl)-1,3-benzodioxan-4-one;
2-butyl-6-(4'-fluorophenyl)-2-methoxy-1,3-benzodioxan-4-one;
2-butyl-6-(4'-chlorophenyl)-2-methoxy-1,3-benzodioxan-4-one;
6-(4'-bromophenyl)-2-butyl-2-methoxy-1,3-benzodioxan-4-one;
2-butyl-6-(4'-iodophenyl)-2-methoxy-1,3-benzodioxan-4-one;
2-butyl-2-methoxy-6-(4'-trifluoromethylphenyl)-1,3-benzodioxan-4-one;
2-ethoxy-5-(4'-fluorophenyl)-2-methyl-1,3-benzodioxan-4-one;
6-(4'-chlorophenyl)-2-ethoxy-2-methyl-1,3-benzodioxan-4-one;
6-(4'-bromophenyl)-2-ethoxy-2-methyl-1,3-benzodioxan-4-one;
2-ethoxy-6-(4'-iodophenyl)-2-methyl-1,3-benzodioxan-4-one;
2-ethoxy-2-methyl-6-phenyl-1,3-benzodioxan-4-one;
2-ethoxy-6-(4'-trifluoromethylphenyl)-2-methyl-1,3-benzodioxan-4-one;
2-ethoxy-2-methyl-6-(4'-methylphenyl)-1,3-benzodioxan-4-one;
2-ethoxy-6-(4'-methoxyphenyl)-2-methyl-1,3-benzodioxan-4-one;
2-ethoxy-6-(4'-fluorophenyl)-2-propyl-1,3-benzodioxan-4-one;
6-(4'-chlorophenyl)-2-ethoxy-2-propyl-1,3-benzodioxan-4-one;
6-(4'-bromophenyl)-2-ethoxy-2-propyl-1,3-benzodioxan-4-one;
2-ethoxy-6-(4'-iodophenyl)-2-propyl-1,3-benzodioxan-4-one;
2-ethoxy-6-phenyl-2-propyl-1,3-benzodioxan-4-one;
2-ethoxy-2-propyl-6-(4'-trifluoromethylphenyl)-1,3-benzodioxan-4-one;
2-ethoxy-6-(4'-methylphenyl)-2-propyl-1,3-benzodioxan-4-one;
2-ethoxy-6-(4'-methoxyphenyl)-2-propyl-1,3-benzodioxan-4-one;
6-(4'-fluorophenyl)-2-heptyl-2-heptyloxy-1,3-benzodioxan-4-one;
6-(4'-chlorophenyl)-2-heptyl-2-heptyloxy-1,3-benzodioxan-4-one;
6-(4'-bromophenyl)-2-heptyl-2-heptyloxy-1,3-benzodioxan-4-one;
2-heptyl-2-heptyloxy-6-(4'-iodophenyl)-1,3-benzodioxan-4-one;
6-(4'-aminophenyl)-2-heptyl-2-heptyloxy-1,3-benzodioxan-4-one; and
2-heptyl-2-heptyloxy-6-(4'-trifluoromethylphenyl)-1,3-benzodioxan-4-one.

The preferred compounds of formula II are those wherein R is fluoro, chloro, or trifluoromethyl and especially where R is fluoro. Particularly preferred compounds are:

2-ethoxy-5-(4'-fluorophenyl)-1,3-benzodioxan-4-one;
6-(4'-chlorophenyl)-2-ethoxy-1,3-benzodioxan-4-one;
2-ethoxy-6-(4'-trifluoromethylphenyl)-1,3-benzodioxan-4-one;
6-(4'-fluorophenyl)-2-methoxy-1,3-benzodioxan-4-one;
6-(4'-chlorophenyl)-2-methoxy-1,3-benzodioxan-4-one;
2-methoxy-6-(4'-trifluoromethylphenyl)-1,3-benzodioxan-4-one;
2-ethoxy-2-ethyl-6-(4'-fluorophenyl)-1,3-benzodioxan-4-one;
6-(4'-chlorophenyl)-2-ethoxy-2-ethyl-1,3-benzodioxan-4-one;
2-ethoxy-2-ethyl-6-(4'-trifluoromethylphenyl)-1,3-benzodioxan-4-one;
2-ethoxy-5-(4'-fluorophenyl)-2-methyl-1,3-benzodioxan-4-one;
6-(4'-chlorophenyl)-2-ethoxy-2-methyl-1,3-benzodioxan-4-one;

2-ethoxy-6-(4'-trifluoromethylphenyl)-2-methyl-1,3-benzodioxan-4-one; and 2-ethoxy-6-(4'-fluorophenyl)-2-propyl-1,3-benzodioxan-4-one.

Typical compounds of formula III, of my invention, include for example:

6-(4'-fluorophenyl)-2,2-dimethyl-1,3-benzodioxane;
6-(4'-chlorophenyl)-2,2-dimethyl-1,3-benzodioxane;
6-(4'-bromophenyl)-2,2-dimethyl-1,3-benzodioxane;
6-(4'-iodophenyl)-2,2-dimethyl-1,3-benzodioxane;
6-phenyl-2,2-dimethyl-1,3-benzodioxane;
6-(4'-trifluoromethylphenyl)-2,2-dimethyl-1,3-benzodioxane;
2,2-dimethyl-6-(4'-methylphenyl)-1,3-benzodioxane;
6-(4'-methoxyphenyl)-2,2-dimethyl-1,3-benzodioxane;
6-(4'-fluorophenyl)-2-methoxy-2-methyl-1,3-benzodioxane;
6-(4'-chlorophenyl)-2-methoxy-2-methyl-1,3-benzodioxane;
6-(4'-bromophenyl)-2-methoxy-2-methyl-1,3-benzodioxane;
6-(4'-iodophenyl)-2-methoxy-2-methyl-1,3-benzodioxane;
2-methoxy-2-methyl-6-phenyl-1,3-benzodioxane;
2-methoxy-2-methyl-6-(4'-trifluoromethylphenyl)-1,3-benzodioxane;
2-methoxy-2-methyl-6-(4'-methylphenyl)-1,3-benzodioxane;
6-(4'-methoxyphenyl)-2-methoxy-2-methyl-1,3-benzodioxane;
6-(4'-fluorophenyl)-2,2-diisopropyl-1,3-benzodioxane;
6-(4'-chlorophenyl)-2,2-diisopropyl-1,3-benzodioxane;
6-(4'-bromophenyl)-2,2-diisopropyl-1,3-benzodioxane;
6-(4'-iodophenyl)-2,2-diisopropyl-1,3-benzodioxane;
2-diisopropyl-6-phenyl-1,3-benzodioxane;
2,2-diisopropyl-6-(4'-trifluoromethylphenyl)-1,3-benzodioxane;
2,2-diisopropyl-6-(4'-methylphenyl)-1,3-benzodioxane;
2,2-diisopropyl-6-(4'-methoxyphenyl)-1,3-benzodioxane;
2-ethyl-6-(4'-fluorophenyl)-2-n-hexyl-1,3-benzodioxane;
6-(4'-chlorophenyl)-2-ethyl-2-n-hexyl-1,3-benzodioxane;
6-(4'-bromophenyl)-2-ethyl-2-n-hexyl-1,3-benzodioxane;
2-ethyl-2-n-hexyl-6-(4'-iodophenyl)-1,3-benzodioxane;
2-ethyl-2-n-hexyl-6-(4'-trifluoromethylphenyl)-1,3-benzodioxane;
6-(4'-fluorophenyl)-1,3-benzodioxane-2-spiro-cyclohexane;
6-(4'-chlorophenyl)-1,3-benzodioxane-2-spiro-cyclohexane;
6-(4'-bromophenyl)-1,3-benzodioxane-2-spiro-cyclohexane; 2
6-(4'-iodophenyl)-1,3-benzodioxane-2spiro-cyclohexane;
6-phenyl-1,3-benzodioxane-2-spiro-cyclohexane;
6-(4'-trifluoromethylphenyl)-1,3-benzodioxane-2-spiro-cyclohexane;
6-(4'-methylphenyl)-1,3-benzodioxane-2-spiro-cyclohexane;
6-(4'-methoxyphenyl)-1,3-benzodioxane-2-spiro-cyclohexane;
6-(4'-fluorophenyl)-1,3-benzodioxane-2-spiro-3'-tetrahydrothiophene;
6-(4'-chlorophenyl)-1,3-benzodioxane-2-spiro-3'-tetrahydrothiophene;
6-(4'-bromophenyl)-1,3-benzodioxane-2-spiro-3'-tetrahydrothiophene;
6-(4'-iodophenyl)-1,3-benzodioxane-2-spiro-3'-tetrahydrothiophene;
6-(4'-trifluoromethylphenyl)-1,3-benzodioxane-2-spiro-3'-tetrahydrothiophene;
6-(4'-fluorophenyl)-1,3-benzodioxane-2-spiro-cyclopentane;
6-(4'-chlorophenyl)-1,3-benzodioxane-2-spiro-cyclopentane;
6-(4'-bromophenyl)-1,3-benzodioxane-2-spiro-cyclopentane;
6-(4'-iodophenyl)-1,3-benzodioxane-2-spiro-cyclopentane;
6-phenyl-1,3-benzodioxane-2-spiro-cyclopentane;
6-(4'-trifluoromethylphenyl)-1,3-benzodioxane-2-spiro-cyclopentane;
6-(4'-methylphenyl)-1,3-benzodioxane-2-spiro-cyclopentane;
6-(4'-fluorophenyl)-1,3-benzodioxane-2-spiro-1'-(4'-methylcycloheptane);
6-(4'-chlorophenyl)-1,3-benzodioxane-2-spiro-1'-(4'-methylcycloheptane);
6-(4'-bromophenyl)-1,3-benzodioxane-2-spiro-1'-(4'-methyl-cycloheptane);
6-(4'-iodophenyl)-1,3-benzodioxane-2-spiro-1'-(4'-methyl-cycloheptane);
6-phenyl-1,3-benzodioxane-2-sprio-1'-(4'-methylcycloheptane);
6-(4'-trifluoromethylphenyl)-1,3-benzodioxane-2-spiro-1'-(4'-methylcycloheptane);
6-(4'-methylphenyl)-1,3-benzodioxane-2-spiro-1'-(4'-methylcycloheptane);
6-(4'-methoxyphenyl)-1,3-benzodioxane-2-spiro-1'-(4'-methylcycloheptane);
6-(4'-methoxyphenyl)-1,3-benzodioxane-2-spiro-1'-(4'-methylcycloheptane);
6-(4'-fluorophenyl)-1,3-benzodioxane-2-spiro-2'-tetrahydrofuran;
6-(4'-chlorophenyl)-1,3-benzodioxane-2-spiro-2'-tetrahydrofuran;
6-(4'-bromophenyl)-1,3-benzodioxane-2-spiro-2'-tetrahydrofuran;
6-(4'-iodophenyl)-1,3-benzodioxane-2-spiro-2'-tetrahydrofuran;
6-phenyl-1,3-benzodioxane-2-spiro-2'-tetrahydrofuran;
6-(4'-trifluoromethylphenyl)-1,3-benzodioxane-2-spiro-2'-tetrahydrofuran;
6-(4'-methylphenyl)-1,3-benzodioxane-2-spiro-2'-tetra-hydrofuran;
6-(4'-methoxyphenyl)-1,3-benzodioxane-2-spiro-2'-tetra-hydrofuran;
6-(4'-fluorophenyl)-1,3-benzodioxane-2-spiro-2'-tetrahydropyran;
6-(4'-chlorophenyl)-1,3-benzodioxane-2-spiro-2'-tetrahydropyran;

6-(4'-bromophenyl)-1,3-benzodioxane-2-spiro-2'-tetra-hydropyran;
6-(4'-iodophenyl)-1,3-benzodioxane-2-spiro-2'-tetrahydropyran;
6-phenyl-1,3-benzodioxane-2-spiro-2'-tetrahydropyran;
6-(4'-trifluoromethylphenyl)-1,3-benzodioxane-2-spiro-2'-tetrahydropyran; and
6-(4'-methoxyphenyl)-1,3-benzodioxane-2-spiro-2'-tetrahydropyran.

The preferred compounds of formula III, of my invention, are again those wherein R is fluoro, chloro, or trifluoromethyl and especially where R is fluoro. Particularly preferred compounds are:
6-(4'-fluorophenyl)-2,2-dimethyl-1,3-benzodioxane;
6-(4'-chlorophenyl)-2,2-dimethyl-1,3-benzodioxane;
6-(4'-trifluoromethylphenyl)-2,2-dimethyl-1,3-benzodioxane;
6-(4'-fluorophenyl)-2,2-diisopropyl-1,3-benzodioxane;
6-(4'-chlorophenyl)-2,2-diisopropyl-1,3-benzodioxane;
2,2-diisopropyl-6-(4'-trifluoromethylphenyl)-1,3-benzodioxane;
2-ethyl-6-(4'-fluorophenyl)-2-n-hexyl-1,3-benzodioxane;
6-(4'-fluorophenyl)-1,3-benzodioxane-2-spiro-cyclohexane;
6-(4'-chlorophenyl)-1,3-benzodioxane-2-spiro-cyclohexane;
6-(4'-trifluoromethylphenyl)-1,3-benzodioxane-2-spiro-cyclohexane;
6-(4'-fluorophenyl)-1,3-benzodioxane-2-spiro-3'-tetra hydrothiophene;
6-(4'-chlorophenyl)-1,3-benzodioxane-2-spiro-3'-tetra hydrothiophene;
6-(4'-trifluoromethylphenyl)-1,3-benzodioxane-2-spiro-3'-tetrahydrothiophene;
6-(4'-fluorophenyl)-1,3-benzodioxane-2-spiro-cyclopentane;
6-(4'-chlorophenyl)-1,3-benzodioxane-2-spiro-cyclopentane;
6-(4'-trifluoromethylphenyl)-1,3-benzodioxane-2-spiro-cyclopentane;
6-(4'-fluorophenyl)-1,3-benzodioxane-2-spiro-1'-(4'-methylcycloheptane);
6-(4'-chlorophenyl)-1,3-benzodioxane-2-spiro-1'-(4'-methylcycloheptane);
6-(4'-trifluoromethylphenyl)-1,3-benzodioxane-2-spiro-1'-(4'-methylcycloheptane);
6-(4'-fluorophenyl)-1,3-benzodioxane-2-spiro-2'-tetra-hydrofuran;
6-(4'-chlorophenyl)-1,3-benzodioxane-2-spiro-2'-tetra-hydrofuran;
6-(4'-trifluoromethylphenyl)-1,3-benzodioxane-2-spiro-2'-tetrahydrofuran;
6-(4'-fluorophenyl)-1,3-benzodioxane-2-spiro-2'-tetra-hydropyran;
6-(4'-chlorophenyl)-1,3-benzodioxane-2-spiro-2'-tetra-hydropyran; and
6-(4'-trifluoromethylphenyl)-1,3-benzodioxane-2-spiro-2'-tetrahydropyran.

Additional examples of typical compounds of my invention can be had by reference to the Examples.

The compounds of formulas II and III of my invention can be conveniently prepared by treating the corresponding 2-hydroxy-6-phenyl-benzoic acid or 2-hydroxy-6-phenyl-benzyl alcohol derivative with a suitable orthoester in the presence of an acid catalyst. For purposes of simplicity, this treatment will be discussed hereinbelow with respect to the preparation of compounds of formula II, however, the procedure is equally applicable to the preparation of the 2-lower alkoxy compounds of formula III, but, of course, using 2-hydroxyphenyl-benzyl alcohol derivatives as starting materials.

This treatment can be represented by the following schematic overall reaction equation:

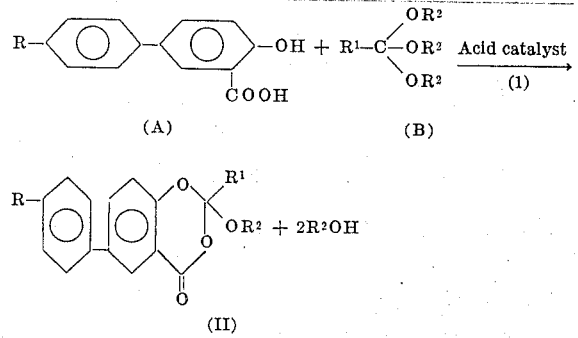

wherein R, $R^1$ and $R^2$ have the same meaning as set forth herein above.

This treatment can be conveniently effected by contacting the compounds of formulas (A) and (B) together, in the presence of an acid catalyst, at temperatures in the range of about from 20° to 100°C for about from one to 48 hours. However, treatment temperatures and times both above and below these ranges can also be used. Typically, longer reaction times will be used with lower reaction temperatures. Best results are obtained by conducting the treatment in benzene at reflux. Preferably the reagents are contacted together in the liquid state. Also the treatment can be optionally conducted in a suitable inert liquid organic medium, which is preferably a solvent for at least one of the reactants. Suitable inert organic reaction media include, for example, benzene, toluene, tetrahydrofuran, dioxane, chloroform, dimethylformamide, carbon tetrachloride, methylene chloride and the like. This reaction can be advantageously promoted by using an aromatic solvent such as, for example, benzene, which facilitates the continuous removal of the alcohol by-product via azeotropic distillation during the reaction. Alternatively, the reaction can be promoted by removing the alcohol by-product by refluxing, or continuously passing a portion of the reaction mixture, through a selective, adsorbent, such as for example calcium Type A (5A°) or faujasite 13X (Type X and Y) zeolite molecular sieves, which will selectively remove the alcohol by-product because of its effective dynamic molecular size or polarity. This adsorption separation, can be conveniently conducted on a laboratory scale via the use of a soxhlet apparatus containing the desired adsorbent. Also a combination of azeotropic distillation and selective adsorption can also be used.

Typically, the treatment will be conducted using mole ratios in the range of about from one to 40 moles of alkyl orthoester per mole of 2-hydroxy-6-phenyl-benzoic acid (formula A) starting materials, however, mole ratios above this range can also be used. The resulting product of formula II of my invention can be separated from the reaction mass by any suitable means, for example, the product can be conveniently separated by extraction with a suitable organic solvent followed by evaporation of the solvent and if desired, further purified by recrystallization and/or chromatography.

Suitable acid catalysts include, for example, p-toluene-sulfonic acid, pyridine hydrochloride, perchloric acid, sulfuric acid, phosphoric acid, trifluoroacetic acid and the like. The alkyl orthoester starting materials of formula (B) are known materials and can be obtained from known sources or prepared according to known procedures such as, for example, described in Org. Syn., Coll. Vol., (edited by Kaufmann and Dreger) vol. 1, page 258 (1941) and cited in Wagner and Zook, Synthetic Organic Chemistry, pages 542–545, Wiley (1963). Suitable alkyl orthoesters include, for example, triethylorthoformate, triethylorthoacetate, trimethylorthoacetate, trimethylorthopropionate, triethylorthopropionate, tripropylorthoformate, tripropylorthoacetate, tripropylorthopropionate, and the like. The 2-hydroxy-5-phenyl-benzoic acid starting materials of formula (A) are also known materials and can be obtained from known sources or prepared according to known procedures such as, for example, those described in Canadian Pats. No. 799,519; 799,520; 799,521; 818,560; and Belgium Patent No. 703,499 or by the application of known procedures for adding the desired R substituent group to such procedures. For example, 5-(4-loweralkyl-phenyl)-2-hydroxy-benzoic acid starting materials can be obtained by treating 5-(4-iodophenyl)-2-hydroxy-benzoic acid according to the procedure of Canadian Patent No. 799,520 to obtain 5-(4-iodophenyl)-2-acetoxy-benzoic acid, which can in turn be esterified, according to conventional procedures to yield 5-(4-iodophenyl)-2-acetoxy-methylbenzoate which in turn can be treated with lithium dialkyl copper to obtain 5-(4-loweralkyl-phenyl)-2-hydroxy-benzoic acid starting materials.

The starting materials of formula (D) can be obtained from known sources or can be prepared according to known procedures such as, for example, by reduction of the corresponding 2-hydroxy-5-phenyl-benzoic acid (formula A) with lithium aluminum hydride. Alternatively, the compounds of formula (D) can be prepared by the same general procedures as used to prepare the compounds of formula (A), such as for example, described in Canadian Patent No. 824,173, but coupling with o-hydroxymethylphenol starting materials in place of o-hydroxy-benzoic acid starting materials.

The compunds of formula II of my invention wherein $R^1$ is lower alkyl and of formula III wherein $R^3$ is lower alkoxy can also be conveniently prepared by treating the corresponding 2-hydroxy-5-phenyl-benzoic acid compound (formula (B)) with a lower alkoxy alkyne. For purposes of simplicity, this treatment will again be discussed hereinbelow with respect to the compounds of formula II, however, the treatment is equally applicable to the preparation of the 2-lower alkoxy compounds of formula III, but using 2-hydroxy-phenyl-benzyl alcohol derivatives as starting materials.

This treatment can be schematically represented by the following overall reaction equation:

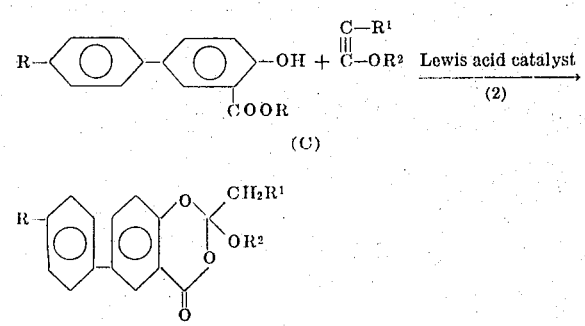

wherein $R^1$ and $R^2$ are as defined herein above.

This treatment can be conveniently effected by contacting the reactants of formulas (A) and (C) together, in the presence of a suitable Lewis acid catalyst. Typically, the treatment is conducted at temperatures in the range of about from −70° to 20°C, for about from one to 48 hours. However, temperatures and treatment times both above and below these ranges can also be used. Preferably the treatment is conducted in a suitable inert organic solvent. Suitable inert organic solvents include, for example, dichloromethane, chloroform, benzene, toluene, dimethylformamide, carbon tetrachloride, and the like. Suitable Lewis acid catalysts which can be used include, for example, mercuric acetate, mercuric sulfate, mercuric chloride, mercuric trifluoroacetate, borontrifluroetherate, aluminum chloride and the like.

Typically, the mole ratio of reactants will be in the range of about from one to 40 moles of lower alkoxy alkyne (formula (C)) per mole of 2-hydroxy-5-phenyl-benzoic acid (formula (A)), however, mole ratios above this can also be used. The lower alkoxy alkyne starting materials of formula (C) are known compounds, having from three through 14 carbon atoms, and can be obtained from known sources or prepared according to known procedures, note for example, Fieser & Fieser, Reagents for Organic Synthesis, pp. 357–360 and 668, Wiley, New York (1967). Suitable lower alkoxy alkynes thus include, for example, methoxy acetylene; ethoxy acetylene; 3-methoxy-2-propyne; 3-ethoxy-2-propyne; 4-methoxy-3-butyne; 4-ethoxy-3-butyne; 4-propoxy-3-butyne; 8-methoxy-7-octyne; 8-ethoxy-7-octyne; 8-propoxy-7-octyne; 8-isopro-poxy-7-octyne; 8-heptyloxy-7-octyne and the like.

The compounds of formula III of my invention, with the exception of those compounds wherein $R^3$ and $R^4$ form an oxo heterocyclic ring, which are more conveniently prepared according to another method, of my invention, which will be subsequently described, can be conveniently prepared according to my invention by treating the corresponding 2-hydroxy-5-phenyl-benzyl alcohol compounds with a suitable aldehyde, acetal, ketone or ketal, as defined by formula (E) hereinbelow.

This treatment can be schematically represented by the following overall reaction equation:

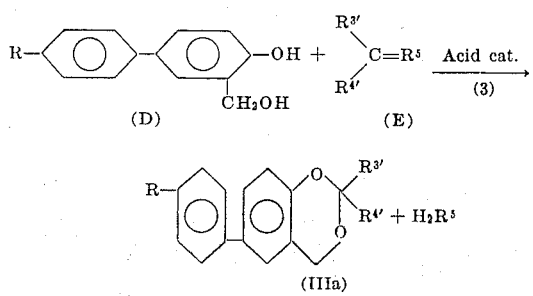

wherein $R^{3'}$ and $R^{4'}$ are independently selected from the group consisting of H and lower alkyl, or together with the carbon atom to which they are joined form a cyclic alkyl group having from five through seven ring carbon atoms, or a thia monocyclic monoheterocyclic group having five or six ring atoms, containing only one non-carbon ring atom, said non-carbon ring atom being sulfur; $R^5$ is oxo or the group

wherein $R^6$ and $R^7$ are the same or different lower alkyls; and R is as defined herein above.

This reaction can be conveniently effected by contacting the reactants of formulas (D) and (E) together at temperatures in the range of about from 20° to 80° for about from one to 48 hours, in the presence of a suitable acid catalyst. However, temperatures and treatment durations both above and below these ranges can also be used. Best results are typically obtained by using the reflux temperature or temperatures approaching the reflux temperature. Preferably the reactants are contacted together in the liquid state and typically are contacted in a suitable inert organic solvent. Suitable inert organic solvents include, for example, benzene, dimethylformamide, toluene, chloroform, methylene chloride, and the like. Suitable acid catalysts include, for example, p-toluenesulfonic acid, perchloric acid, pyridine hydrochloride, sulfuric acid, phosphoric acid, trifluoroacetic acid, and the like. Also this reaction can be advantageously promoted via use of the azeotropic distillation and/or selective adsorption procedures previously described hereinabove to remove the by-product water or alcohol.

The relative mole ratio of reactants is preferably in the range of about from one to 40 moles of compound of formula (E) per mole of the 2-hydroxy-5-phenyl-benzyl alcohol compound of formula (D). The compounds of formula (E) are known compounds or can be prepared by known procedures, or obvious modifications thereof, to effect the desired substituents. Typical procedures for preparing such compounds are, for example, cited in Wagner and Zook, Synthetic Organic Chemistry, Wiley, New York (1953); acetals — page 268; ketals — page 273; aldehydes — page 298; and ketones — page 352.

After the treatment is effected, the desired product (formula IIIa) can be separated by any suitable procedure, for example, extraction, evaporation, crystallization, chromatography and recrystallization.

The compounds of formula III wherein $R^3$ and $R^4$ form, together with the carbon atom to which they are joined, an oxygen containing heterocyclic ring can be more conveniently prepared by treating the corresponding 2-hydroxy-5-phenyl-benzyl alcohol (formula (D)) with an O-lower alkyl alkanoic acid lactonium tetrafluoroborate in the presence of a suitable base. This can be schematically represented by the following overall reaction equation:

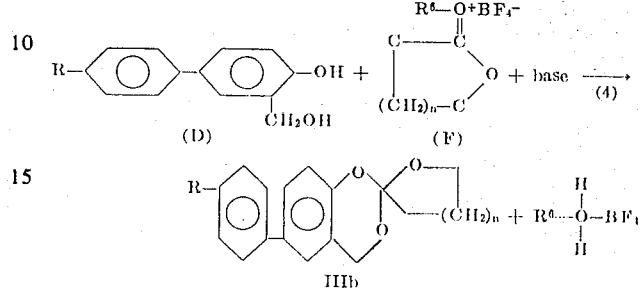

wherein $R^6$ is lower alkyl; n is a whole integer of from one through 4 (i.e., n is 1 or 2), and R is as defined hereinabove.

The treatment is typically conducted by contacting the 2-hydroxy-5-phenyl-benzyl alcohol of formula (D) with the O-alkyl alkanoic acid lactonium tetrafluoroborate of formula (F), in the presence of a suitable base, and preferably is conducted in a liquid inert organic reaction media. The treatment is typically conducted at temperatures in the range of about from 0° to 30°C for about from 5 minutes to 5 hours. However, treatment temperatures and times both above and below these ranges can also be used. The reagents can be contacted and maintained in any convenient order or fashion and preferably the treatment is conducted under anhydrou conditions. After the treatment, the desired product (formula IIIa) can be separated and isolated from the reaction mixture by any technique such as, for example, evaporation, filtration, decantation, extraction, chromatography, and the like.

Suitable liquid inert organic reaction media include those usually employed in organic reactions such as, for example, aromatics, e.g., benzene, toluene; ethers, e.g., dioxane, diethylether, and the like; and, preferably, the halogenated hydrocarbons, e.g., chloroform, methylene chloride, carbon tetrachloride, 1,2-dichloroethane, 1,1-dichloroethane, and the like; either individually or mixtures thereof. Suitable base catalysts include, for example, ammonia; primary alkylamines, e.g., methylamine, ethylamine, isopropylamine, n-propylamine, and the like; secondary alkylamines, e.g., dimethylamine, diethylamine, methylpropylamine, and the like; trialkylamines, e.g., trimethylamine, triethylamine, and the like; and monocyclic heterocyclic amines, e.g., pyridine, collidine, piperidine, morpholine, and the like.

The reaction consumes the reactants on the basis of one equivalent of 2-hydroxy-5-phenyl-benzyl alcohol formula (D) per equivalent of the O-alkyl alkanoic acid lactonium tetrafluoroborate (formula (F)) per equivalent of base. However, the relative amounts of the reactants employed are not critical, some of the desired product being prepared when employing any proportions thereof. Best results are typically obtained by using about from one to 5 equivalents of each of the O-alkyl alkanoic acid lactonium tetrafluoroborate and base per equivalent of 2-hydroxy-5-phenyl-benzyl alcohol starting material.

The O-alkyl alkanoic acid lactonium tetrafluoroborate is prepared by reacting together a trialkyloxonium tetra-fluoroborate and an alkanoic acid lactone, preferably in liquid inert organic reaction media at from about 0° to about 20°C for about from 24 to 48 hours. This method is more completely described in Ber. 89, 2060 (1965), which is hereby incorporated by reference. The process for preparing the O-alkyl alkanoic acid lactonium tetrafluoroborate is also preferably conducted under anhydrous conditions.

The compounds of my invention exhibit analgesic activity, in mammals, and thus are useful in alleviating or mitigating headaches, muscular aches and pains, and the like, occurring in mammals, and also for temporary relief or mitigation of pain associated with conditions such as arthritis, rheumatism, bursitis, and the like. The compounds of my invention also exhibit both antipyretic and anti-inflammatory activity in mammals and thus are useful in reducing or combating fever and/or inflamation in mammals. The compounds of my invention are typically administered in dosages in the range of about from 50 to 2,000 mg. per day per 150 pounds of mammal weight. The compounds are preferably administered orally in any pharmaceutically suitable form for oral administration. Thus, for example, the compounds can be administered as pills, either as the sole ingredient of a pill or in conjunction with suitable pharmaceutical carriers or excipients and binders, and can also be combined with other pharmaceutically compatible pharmaceutically active agents.

A further understanding of the invention can be had from the following illustrative nonlimiting examples; wherein all molar and equiv. etc., quantities refer to gram quantities.

EXAMPLE 1

This example illustrates methods of preparing 5-(4-lower-alkyl-phenyl)-2-hydroxy-benzoic acid starting materials. In this example, 1.2 g. molar equivalents of lithium dimethyl copper in 50 ml. of tetrahydrofuran-ether (1:1 by vol.) is added to a solution of 5 g. of 5-(4-iodophenyl)-2-acetoxy-methylbenzoate in 100 ml. of tetrahydrofuran at room temperature (i.e., about 20°C). The reaction mixture is allowed to stand for 24 hours and then washed with water, dried over sodium sulfate and evaporated affording a residue of crude 5-(4-methylphenyl)-2-acetoxy-methylbenzoate, which is then further purified by chromatography over neutral alumina and crystallization using an acetone-hexane solvent.

One gram of the purified product is added to 25 ml. of ethanol and then mixed and boiled with an excess of sodium hydroxide for six hours. This mixture is then allowed to cool to room temperature (i.e., about 20°C) and acidified by the addition of an excess of 1N aqueous hydrochloric acid to a pH of 1. 100 Ml. of water are then added affording a precipitate of 5-(4-methylphenyl)-2-hydroxy-benzoic acid which is then recovered by filtration, washed with water until neutral and then dried.

By following the same procedure, but respectively replacing lithium dimethyl copper with lithium diethyl copper and lithium dipropyl copper, the starting materials 5-(4-ethylphenyl)-2-hydroxy-benzoic acid and 5-(4-propylphenyl)-2-hydroxy-benzoic acid are respectively prepared.

EXAMPLE 2

This example illustrates methods of preparing 5-(4-trifluoromethyl)-2-hydroxy-benzoic acid starting materials. In this example, 1 g. of 5-(4-iodophenyl)-2-acetoxy-methylbenzoate is dissolved in 50 ml. of dimethylformamide in a steel bomb. 3 g.-molar equivalents of iodotrifluoromethane gas is condensed in this solution by cooling to −40°C. Two grams of powdered copper is then added and the bomb sealed and heated to 140°C and maintained at this temperature for 5 hours. The mixture is then allowed to cool to room temperature (i.e., about 20°C) and the bomb then vented to relieve pressure. The reaction mixture is then filtered to remove the powdered copper and poured into 200 ml. of water and extracted with three times 100 ml. aliquots of ethyl acetate. The ethyl acetate extracts are combined and evaporated to dryness affording crude 5-(4-trifluoromethylphenyl)-2-acetoxy-methylbenzoate which is then further purified by chromatography over neutral alumina and crystallization using an acetone-hexane solvent.

One gram of the purified product is added to 25 ml. of ethanol and then mixed and boiled with an excess of sodium hydroxide for six hours. This mixture is then allowed to cool to room temperature (i.e., about 20°C) and acidified by the addition of an excess of 1N aqueous hydrochloric acid to a pH of 1. 100 Ml. of water are then added affording a precipitate of 5-(4-trifluoromethylphenyl)-2-hydroxy-benzoic acid which is then recovered by filtration, washed with water until neutral and then dried.

EXAMPLE 3

This example illustrates methods of preparing 5-(4-lower-alkoxyphenyl)-2-hydroxy-benzoic acid starting materials. In this example an aqueous solution of 0.1 moles of sodium nitrile in 20 ml. of water is slowly added dropwise to a constantly stirred mixture of 0.1 moles of 5-(4-aminophenyl)-2-hydroxymethylbenzoate in 60 ml. of 6N aqueous sulfuric acid (which is prepared by the addition of 5-(4-aminophenyl)-2-hydroxymethylbenzoate to the sulfuric acid solution at 0°C) at 5°C. The resulting mixture is constantly stirred and maintained at 5°C for an additional hour and then added to a boiling solution containing 10 ml. of concentrated sulfuric acid and 90 ml. of water. The mixture is boiled for an additional 5 minutes and then allowed to cool to room temperature and then further cooled to about 7°C and stored at this temperature for 8 hours, resulting in the crystallization of a crude intermediate product which is recovered by filtration. One gram of this intermediate is dissolved in 30 ml. of a 1:1 (by vol.) mixture of methanol and water at room temperature (i.e., about 20°C). Two equivalents of a 1 percent aqueous potassium hydroxide solution is then added to this solution, followed by the addition of 2 equiv. of dimethylsulfate. The resulting mixture is stirred at room temperature for 2 hours and then extracted with ethyl acetate. The ethyl acetate extract is washed with water and then evaporated affording a crude 5-(4-methoxyphenyl)-2-hydroxymethylbenzoate residue which is further purified by chromatography on silica gel followed by recrystallization from a methylene chloride:ether solvent mixture.

One gram of the above product is heated for 1 hour at reflux in 50 ml. of a 2 percent potassium hydroxide-methanol solution containing a trace of water and then cooled and evaporated. 100 Ml. of water are then added to the residue followed by the addition of 5 ml. of concentrated acetic acid. The acidified mixture is then extracted with ethyl acetate and the resulting ethyl acetate extracts evaporated to dryness affording a crude 5-(4-methoxyphenyl)-2-hydroxy-benzoic acid residue which is further purified by chromatography over neutral alumina.

Similarly, 5-(4-ethoxyphenyl)-2-hydroxy-benzoic acid is prepared by following the same procedure but using diethylsulfate in place of dimethylsulfate.

EXAMPLE 4

This example illustrates methods according to my invention of preparing the 6-phenyl-1,3-benzodioxan-4-one compounds of formula II of my invention. In this example 2.3 ml. (15 mmoles) of triethyl orthoformate is added dropwise to a solution of 2.3 g. (10 mmoles) of 5-(4'-fluorophenyl)-2-hydroxy-benzoic acid and 2 mg. of p-toluenesulfonic acid in 50 ml. of benzene. The mixture is then refluxed for 4 hours, then allowed to cool to room temperature and neutralized by the addition of 50 ml. of aqueous 10 percent sodium carbonate solution. The organic phase is then separated, washed three times with 50 ml. aliquots of water and then evaporated to dryness. The resulting residue is further purified by chromatography affording 2-ethoxy-6-(4'-fluorophenyl)-1,3-benzodioxan-4-one.

By following the same procedure as above but using the corresponding 2-hydroxy-5-phenyl-benzoic acid derivatives as starting materials, the following compounds are prepared:
  6-(4'-chlorophenyl)-2-ethoxy-1,3-benzodioxan-4-one;
  6-(4'-bromophenyl)-2-ethoxy-1,3-benzodioxan-4-one;
  2-ethoxy-6-(4'-iodophenyl)-1,3-benzodioxan-4-one;
  2-ethoxy-6-phenyl-1,3-benzodioxan-4-one;
  2-ethoxy-6-(4'-trifluoromethylphenyl)-1,3-benzodioxan-4-one;
  2-ethoxy-6-(4'-methylphenyl)-1,3-benzodioxan-4-one; and
  2-ethoxy-6-(4'-methoxyphenyl)-1,3-benzodioxan-4-one.

By following the same procedure but using trimethylorthoformate in place of triethylorthoformate, the following compounds are respectively prepared:
  6-(4'-fluorophenyl)-2-methoxy-1,3-benzodioxan-4-one;
  6-(4'-chlorophenyl)-2-methoxy-1,3-benzodioxan-4-one;
  6-(4'-bromophenyl)-2-methoxy-1,3-benzodioxan-4-one;
  6-(4'-iodophenyl)-2-methoxy-1,3-benzodioxan-4-one;
  2-methoxy-6-phenyl-1,3-benzodioxan-4-one;
  2-methoxy-6-(4'-trifluoromethylphenyl)-1,3-benzodioxan-4-one;
  2-methoxy-6-(4'-methylphenyl)-1,3-benzodioxan-4-one; and
  2-methoxy-6-(4'-methoxyphenyl)-1,3-benzodioxan-4-one.

By following the same procedure but using triethylorthopropionate in place of triethylorthoformate, the following compounds are respectively prepared:
  2-ethoxy-2-ethyl-6-(4'-fluorophenyl)-1,3-benzodioxan-4-one;
  6-(4'-chlorophenyl)-2-ethoxy-2-ethyl-1,3-benzodioxan-4-one;
  6-(4'-bromophenyl)-2-ethoxy-2-ethyl-1,3-benzodioxan-4-one;
  2-ethoxy-2-ethyl-6-(4'-iodophenyl)-1,3-benzodioxan-4-one;
  2-ethoxy-2-ethyl-6-phenyl-1,3-benzodioxan-4-one;
  2-ethoxy-2-ethyl-6-(4'-trifluoromethylphenyl)-1,3-benzodioxan-4-one;
  2-ethoxy-2-ethyl-6-(4'-methylphenyl)-1,3-benzodioxan-4-one; and
  2-ethoxy-2-ethyl-6-(4'-methoxyphenyl)-1,3-benzodioxan-4-one.

By following the same procedures as above but using trimethylorthovalerate in place of triethylorthoformate, the following compounds are respectifully prepared:
  2-butyl-6-(4'-fluorophenyl)-2-methoxy-1,3-benzodioxan-4-one;
  2-butyl-6-(4'-chlorophenyl)-2-methoxy-1,3-benzodioxan-4-one;
  6-(4'-bromophenyl)-2-butyl-2-methoxy-1,3-benzodioxan-4-one;
  2-butyl-6-(4'-iodophenyl)-2-methoxy-1,3-benzodioxan-4-one;
  2-butyl-2-methoxy-6-phenyl-1,3-benzodioxan-4-one;
  2-butyl-2-methoxy-6-(4'-trifluoromethylphenyl)-1,3-benzodioxan-4-one;
  2-butyl-2-methoxy-6-(4'-methylphenyl)-1,3-benzodioxan-4-one; and
  2-butyl-2-methoxy-6-(4'-methoxyphenyl)-1,3-benzodioxan-4-one.

EXAMPLE 5

This example illustrates further methods according to my invention of preparing the 6-phenyl-1,3-benzodioxan-4-one compounds of formula II of my invention. In this example 4.2 g. of ethoxy acetylene in 25 ml. of dichloromethane is added dropwise over a period of 15 minutes to 6.95 g. of 5-(fluorophenyl)-2-hydroxy-benzoic acid in 75 ml. of dichloromethane containing 1 gram of mercuric acetate, in a dry ice and acetone bath. The dry ice and acetone bath is allowed to evaporate and the mixture allowed to rise to room temperature (i.e., about 20°C) over a period of three hours. The dichloromethane solvent is then removed by evaporation under vacuum. The resulting concentrate is then distilled affording a distillate of crude 2-ethoxy-5-(4'-fluorophenyl)-2-methyl-1,3-benzodioxan-4-one which is then further purified by thin-layer chromatography.

By following the same procedure as above but using the corresponding 2-hydroxy-5-phenyl-benzoic acid derivatives as starting materials, the following compounds are respectively prepared:
  6-(4'-chlorophenyl)-2-ethoxy-2-methyl-1,3-benzodioxan-4-one;
  6-(4'-bromophenyl)-2-ethoxy-2-methyl-1,3-benzodioxan-4-one;
  2-ethoxy-6-(4'-iodophenyl)-2-methyl-1,3benzodioxan-4-one;
  2-ethoxy-2-methyl-6-phenyl-1,3-benzodioxan-4-one;

2-ethoxy-6-(4'-trifluoromethylphenyl)-2-ethyl-1,3-benzo-dioxan-4-one;
2-ethoxy-2-methyl-6-(4'-methylphenyl)-1,3-benzodioxan-4-one; and
2-ethoxy-6-(4'-methoxyphenyl)-2-methyl-1,3-benzodioxan-4-one.

By following the same procedure but using 4-ethoxy-3-butyne in place of ethoxy-acetylene, the following compounds are respectively prepared:
2-ethoxy-6-(4'-fluorophenyl)-2-propyl-1,3-benzodioxan-4-one;
6-(4'-chlorophenyl)-2-ethoxy-2-propyl-1,3-benzodioxan-4-one;
6-(4'-bromophenyl)-2-ethoxy-2-propyl-1,3-benzodioxan-4-one;
2-ethoxy-6-(4'-iodophenyl)-2propyl-1,3-benzodioxan-4-one;
2-ethoxy-6-phenyl-2-propyl-1,3-benzodioxan-4-one;
2-ethoxy-2-propyl-6-(4'-trifluoromethylphenyl)-1,3-benzodioxan-4-one;
2-ethoxy-6-(4'-methylphenyl)-2-propyl-1,3-benzodioxan-4-one; and
2-ethoxy-6-(4'-methoxyphenyl)-2-propyl-1,3-benzodioxan-4-one.

By following the same procedure as above but using 8-heptyloxy-7-octyne in place of ethoxy-acetylene, the following compounds are respectively prepared:
6-(4'-fluorophenyl)-2-heptyl-2-heptyloxy-1,3-benzodioxan-4-one;
6-(4'-chlorophenyl)-2-heptyl-2-heptyloxy-1,3-benzodioxan-4-one;
6-(4'-bromophenyl)-2-heptyl-2-heptyloxy-1,3-benzodioxan-4-one;
2-heptyl-2-heptyloxy-6-(4'-iodophenyl)-1,3-benzodioxan-4-one;
2-heptyl-2-heptyloxy-6-(4'-trifluoromethylphenyl-1,3-benzodioxan-4-one;
2-heptyl-2-heptyloxy-6-(4'-methylphenyl)-1,3-benzodioxan-4-one; and
2-heptyl-2-heptyloxy-6-(4'-methoxyphenyl)-1,3benzodioxan-4-one.

EXAMPLE 6

This example illustrates methods of preparing the 2-hydroxy-5-phenyl-benzyl alcohol starting materials of formula (D) by the reduction of the corresponding 2-hydroxy-5-phenyl-benzoic acids. In this example 0.57 g. (15mmoles) of powdered lithium aluminum hydride in 5 ml. of tetrahydrofuran is slowly added over a period of ten minutes to a refluxing mixture of 4.64 (20 mmoles) of 5-(4'-fluorophenyl)-2-hydroxy-benzoic acid in 15 ml. of tetrahydrofuran in a reflux apparatus having a remote vent to permit the escape of by-product hydrogen released by the reaction. The resulting mixture is then refluxed for an additional two hours and then cooled to 50°C and concentrated to a volume of 15 ml. by vacuum evaporation. The concentrate is treated in an excess of acetone and then hydrolyzed by the addition of 5 ml. of water at 40°C and allowed to cool to and stand at 40°C for 20 minutes and then further concentrated to a volume of 11 ml. by vacuum evaporation. The 11 ml. concentrate is cooled to room temperature (i.e., about 20°C), then filtered and the resulting filtrate successively extracted with five 5 ml. portions of benzene. The benzene extracts are then combined and evaporated to dryness affording a residue of crude 5-(4'-fluorophenyl)-2-hydroxy-benzyl alcohol, which is further purified by thin-layer chromatography.

Similarly by following the same procedure as above but using the corresponding 5-position phenyl benzoic acid derivatives as starting materials, the following compounds are respectively prepared:
5-(4'-chlorophenyl)-2-hydroxyl-benzyl alcohol;
5-(4'-bromophenyl)-2-hydroxyl-benzyl alcohol;
2-hydroxyl-5-(4'-iodophenyl)-benzyl alcohol;
2-hydroxyl-5-phenyl-benzyl alcohol;
2-hydroxyl-5-(4'-trifluoromethylphenyl)-benzyl alcohol;
2-hydroxyl-5-(4'-methylphenyl)-benzyl alcohol; and
2-hydroxyl-5-(4'-methoxyphenyl)-benzyl alcohol.

EXAMPLE 7

This example illustrates methods according to my invention of preparing the 2-alkoxy compounds of formula III of my invention. In this example 2.3 ml. (15 m-moles) of triethyl orthoformate is added dropwise to a solution of 2.18 g. (10 mmoles) of 5-(4'-fluorophenyl)-2-hydroxy-benzyl alcohol and 2 mg. of p-toluenesulfonic acid in 50 ml. of benzene. The mixture is then refluxed for 4 hours, then allowed to cool to room temperature and neutralized by the addition of 50 ml. of aqueous 10 percent sodium carbonate solution. The organic phase is then separated, washed three times with 50 ml. aliquots of water and then evaporated to dryness. The resulting residue is further purified by chromatography affording 2-ethoxy-6-(4'-fluorophenyl)-1,3-benzodioxane.

By following the same procedure as above but using the corresponding 2-hydroxy-5-phenyl-benzyl alcohol derivatives as starting materials, the following compounds are prepared:
6-(4'-chlorophenyl)-2-ethoxy-1,3-benzodioxane;
6-(4'-bromophenyl)-2-ethoxy-1,3-benzodioxane;
2-ethoxy-6-(4'-iodophenyl)-1,3-benzodioxane;
2-ethoxy-6-phenyl-1,3-benzodioxane;
2-ethoxy-6-(4'-trifluoromethylphenyl)-1,3-benzodioxane;
2-ethoxy-6-(4'-methylphenyl)-1,3-benzodioxane; and
2-ethoxy-6-(4-methoxyphenyl)-1,3-benzodioxane.

By following the same procedure but using trimethylorthoformate in place of triethylorthoformate, the following compounds are respectively prepared:
6-(4'-fluorophenyl)-2-methoxy-1,3-benzodioxane;
6-(4'-chlorophenyl)-2-methoxy-1,3-benzodioxane;
6-(4'-bromophenyl)-2-methoxy-1,3-benzodioxane;
6-(4'-iodophenyl)-2-methoxy-1,3-benzodioxane;
2-methoxy-6-phenyl-1,3-benzodioxane;
2-methoxy-6-(4'-trifluoromethylphenyl)-1,3-benzodioxane;
2-methoxy-6-(4'-methylphenyl)-1,3-benzodioxane; and
2-methoxy-6-(4'-methoxyphenyl)-1,3-benzodioxane.

By following the same procedure but using triethylorthopropionate in place of triethylorthoformate, the following compounds are respectively prepared:
2-ethoxy-2-ethyl-6-(4'-fluorophenyl)-1,3-benzodioxane;
6-(4'-chlorophenyl)-2-ethoxy-2-ethyl-1,3-benzodioxane;
6-(4'-bromophenyl)-2-ethoxy-2-ethyl-1,3-benzodioxane;

2-ethoxy-2-ethyl-6-(4'-iodophenyl)-1,3-benzodioxane;
2-ethoxy-2-ethyl-6-phenyl-1,3-benzodioxane;
2-ethoxy-2-ethyl-6-(4'-trifluoromethylphenyl)-1,3-benzodioxane;
2-ethoxy-2-ethyl-6-(4'-methylphenyl)-1,3-benzodioxane; and
2-ethoxy-2-ethyl-6-(4'-methoxyphenyl)-1,3-benzodioxane.

By following the same procedures as above but using trimethylorthovalerate in place of triethylorthoformate, the following compounds are respectfully prepared:
2-butyl-6-(4'-fluorophenyl)-2-methoxy-1,3-benzodioxane;
2-butyl-6-(4'-chlorophenyl)-2-methoxy-1,3-benzodioxane;
6-(4'-bromophenyl)-2-butyl-2-methoxy-1,3-benzodioxane;
2-butyl-6-(4'-iodophenyl)-2-methoxy-1,3-benzodioxane;
2-butyl-2-methoxy-6-phenyl-1,3-benzodioxane;
2-butyl-2-methoxy-6-(4-trifluoromethylphenyl)-1,3-benzodioxane;
2-butyl-2-methoxy-6-(4'-methylphenyl)-1,3-benzodioxane; and
2-butyl-2-methoxy-6-(4'-methoxyphenyl)-1,3-benzodioxane.

EXAMPLE 8

This example illustrates further methods according to my invention of preparing 2-alkoxy compounds of formula III of my invention. In this example 4.2 g. of ethoxy acetylene in 25 ml. of dichloromethane is added dropwise over a period of 15 minutes to 6.53 g. of 5-(fluorophenyl)-2-hydroxy-benzyl alcohol in 75 ml. of dichloromethane containing 1 gram of mercuric acetate, in a dry ice and acetone bath. The dry ice and acetone bath is allowed to evaporate and the mixture allowed to rise to room temperature (i.e., about 20°C) over a period of three hours. The dichloromethane solvent is then removed by evaporation under vacuum. The resulting concentrate is then distilled affording a distillate of crude 2-ethoxy-5-(4'-fluorophenyl)-2-methyl-1,3-benzodioxane which is then further purified by thin-layer chromatography.

By following the same procedure as above but using the corresponding 2-hydroxy-5-phenyl-benzyl alcohol derivatives as starting materials, the following compounds are respectively prepared:
6-(4'-chlorophenyl)-2-ethoxy-2-methyl-1,3-benzodioxane;
6-(4'-bromophenyl)-2-ethoxy-2-methyl-1,3-benzodioxane;
2-ethoxy-6-(4'-iodophenyl)-2-methyl-1,3-benzodioxane;
2-ethoxy-2-methyl-6-phenyl-1,3-benzodioxane;
2-ethoxy-6-(4'-trifluoromethylphenyl)-2-ethyl-1,3benzo-dioxane;
2-ethoxy-2-methyl-6-(4'-methylphenyl)-1,3-benzodioxane; and
2-ethoxy-6-(4'-methoxyphenyl)-2-methyl-1,3-benzodioxane.

By following the same procedure but using 4-ethoxy-3-butyne in place of ethoxy-acetylene, the following compounds are respectively prepared:
2-ethoxy-6-(4'-fluorophenyl)-2-propyl-1,3-benzodioxane;
6-(4'-chlorophenyl)-2-ethoxy-2-propyl-1,3-benzodioxane;
6-(4'-bromophenyl)-2-ethoxy-2-propyl-1,3-benzodioxane;
2-ethoxy-6-(4'-iodophenyl)-2-propyl-1,3-benzodioxane;
2-ethoxy-6-phenyl-2-propyl-1,3-benzodioxane;
2-ethoxy-2-propyl-6-(4'-trifluoromethylphenyl)-1,3-benzo-dioxane;
2-ethoxy-6-(4'-methylphenyl)-2-propyl-1,3-benzodioxane; and
2-ethoxy-6-(4'-methoxyphenyl)-2-propyl-1,3-benzodioxane.

By following the same procedure as above but using 8-heptyloxy-7-octyne in place of ethoxy-acetylene, the following compounds are respectively prepared:
6-(4'-fluorophenyl)-2-heptyl-2-heptyloxy-1,3-benzodioxane;
6-(4'-chlorophenyl)-2-heptyl-2-heptyloxy-1,3-benzodioxane;
6-(4'-bromophenyl)-2-heptyl-2-heptyloxy-1,3-benzodioxane;
2-heptyl-2-heptyloxy-6-(4'-iodophenyl)-1,3-benzodioxane;
2-heptyl-2-heptyloxy-6-phenyl-1,3-benzodioxane;
2-heptyl-2-heptyloxy-6-(4'-trifluoromethylphenyl)-1,3-benzodioxane;
2-heptyl-2-heptyloxy-6-(4'-methylphenyl)-1,3-benzodioxane;
2-heptyl-2-heptyloxy-6-(4'-methoxyphenyl)-1,3-benzodioxane; and
6-(4'-diphenyl)-2-heptyl-2-heptyloxy-1,3-benzodioxane.

EXAMPLE 9

This example illustrates methods according to my invention of preparing the compounds of formula III of my invention. In this example 0.5 grams of 5-(4'-fluorophenyl)-2-hydroxybenzyl alcohol and 0.1 ml. of 70 percent perchloric acid are respectively added to 10 ml. of acetone. The resulting mixture is stirred for 8 hours at room temperature (i.e., about 20°C) and then neutralized by the addition of 10 ml. of distilled water containing 0.5 g. of sodium bicarbonate. The mixture is then concentrated by vacuum evaporation to remove excess acetone, resulting in a precipitate which is then recovered by filtration. The precipitate is then further purified by two recrystallizations using acetone as the solvent, affording 6-(4'-fluorophenyl)-2,2-dimethyl-1,3-benzodioxane.

By following the same procedure but using the corresponding 2-hydroxy-5-phenyl benzyl alcohol derivatives as starting materials, the following compounds are respectively prepared:
6-(4'-chlorophenyl)-2,2-dimethyl-1,3-benzodioxane;
6-(4'-bromophenyl)-2,2-dimethyl-1,3-benzodioxane;
6-(4'-iodophenyl)-2,2-dimethyl-1,3-benzodioxane;
6-phenyl-2,2-dimethyl-1,3-benzodioxane;
6-(4'-trifluoromethylphenyl)-2,2-dimethyl-1,3-benzo-dioxane;
2,2-dimethyl-6-(4'-methylphenyl)-1,3-benzodioxane; and
6-(4'-methoxyphenyl)-2,2-dimethyl-1,3-benzodioxane.

Similarly, by following the same procedure but using diisopropyl ketone in place of acetone, the following compounds are respectively prepared:
  6-(4'-fluorophenyl)-2,2-diisopropyl-1,3-benzodioxane;
  6-(4'-chlorophenyl)-2,2-diisopropyl-1,3-benzodioxane;
  6-(4'-bromophenyl)-2,2-diisopropyl-1,3-benzodioxane;
  6-(4'-iodophenyl)-2,2-diisopropyl-1,3-benzodioxane;
  2-diisopropyl-6-phenyl-1,3-benzodioxane;
  2,2-diisopropyl-6-(4'-trifluoromethylphenyl)-1,3-benzodioxane;
  2,2-diisopropyl-6-(4'-methylphenyl)-1,3-benzodioxane; and
  2,2-diisopropyl-6-(4'-methoxyphenyl)-1,3-benzodioxane.

By following the same procedure as above but using ethyl n-hexyl ketone in place of acetone, the following compounds are prepared:
  2-ethyl-6-(4'-fluorophenyl)-2-n-hexyl-1,3-benzodioxane;
  6-(4'-chlorophenyl)-2-ethyl-2-n-hexyl-1,3-benzodioxane;
  6-(4'-bromophenyl)-2-ethyl-2-n-hexyl-1,3-benzodioxane;
  2-ethyl-2-n-hexyl-6-(4'-iodophenyl)-1,3-benzodioxane;
  2-ethyl-2-n-hexyl-6-phenyl-1,3-benzodioxane;
  2-ethyl-2-n-hexyl-6(4'-trifluoromethylphenyl)-1,3-benzodioxane;
  2-ethyl-2-n-hexyl-6-(4'-methylphenyl)-1,3-benzodioxane; and
  2-ethyl-2-n-hexyl-6-(4'-methoxyphenyl)-1,3-benzodioxane.

EXAMPLE 10

This example illustrates methods according to my invention of preparing the compounds of formula III of my invention. In this example 5.2 ml. (50 mmoles) of cyclohexanone is added to a mixture containing 4.36 g. (20 mmoles) of 5-(4'-fluoro-phenyl)-2-hydroxy-benzyl alcohol and 20 mg. of p-toluene-sulfonic acid in 100 ml. of benzene. The mixture is refluxed for four hours and then neutralized by the addition of 10 ml. of 10 percent (by weight) aqueous potassium carbonate solution. The neutralized mixture is then concentrated by vacuum evaporation to remove any benzene solvent. The concentrate is then subjected to thin-layer chromatography affording crude 6-(4'-fluorophenyl)-1,3-benzodioxane-2-spiro-cyclohexane which is then further purified by recrystallization using ether-hexane.

By following the same procedure as above but using the corresponding 2-hydroxy-5-phenyl-benzyl alcohol derivatives as starting materials, the following compounds are respectively prepared:
  6-(4'-chlorophenyl)-1,3-benzodioxane-2-spiro-cyclohexane;
  6-(4'-bromophenyl)-1,3-benzodioxane-2-spiro-cyclohexane;
  6-(4'-iodophenyl)-1,3-benzodioxane-2-spiro-cyclohexane;
  6-phenyl-1,3-benzodioxane-2-spiro-cyclohexane;
  6-(4'-trifluoromethylphenyl)-1,3-benzodioxane-2-spiro-cyclohexane;
  6-(4'-methylphenyl)-1,3-benzodioxane-2-spiro-cyclohexane; and
  6-(4'-methoxyphenyl)-1,3-benzodioxane-2-spiro-cyclohexane.

Similarly, by following the same procedure but using tetrahydrothiophen-3-one in place of cyclohexanone, the following compounds are respectively prepared:
  6-(4'-fluorophenyl)-1,3-benzodioxane-2-spiro-3'-tetrahydrothiophene;
  6-(4'-chlorophenyl)-1,3-benzodioxane-2-spiro-3'-tetrahydrothiophene;
  6-(4'-bromophenyl)-1,3-benzodioxane-2-spiro-3'-tetrahydrothiophene;
  6-(4'-iodophenyl)-1,3-benzodioxane-2-spiro-3'-tetrahydrothiophene;
  6-phenyl-1,3-benzodioxane-2-spiro-3'-tetrahydrothiophene;
  6-(4'-trifluoromethylphenyl)-1,3-benzodioxane-2-spiro-3'-tetrahydrothiophene;
  6-(4'-methylphenyl)-1,3-benzodioxane-2-spiro-3'-tetra-hydrothiophene; and
  6-(4'-methoxyphenyl)-1,3-benzodioxane-2-spiro-3'-tetra-hydrothiophene.

EXAMPLE 11

This example illustrates further methods according to my invention of preparing the compounds of formula III of my invention. In this example 5.8 ml. (50 mmoles) of 2,2-diethoxypropane is added to 4.36 g. (20 mmoles) of 5-(4'-fluorophenyl)-2-hydroxy-benzyl alcohol and 100 mg. of p-toluenesulfonic acid in 100 ml. of benzene. The mixture is then refluxed for 6 hours in a soxhlet apparatus (containing 4 g. of 13X molecular sieve zeolite beads to remove by-product ethanol) and then allowed to cool to room temperature. The cooled mixture is then neutralized by the addition of 200 mg. of sodium bicarbonate. The neutralized mixture is then evaporated to dryness and the resulting residue redissolved in a mixture of methylene chloride and ether (9:1, by volume), then filtered. The filtrate is then subjected to thin-layer chromatography affording crude 6-(4'-fluoro-phenyl)-2,2-dimethyl-1,3-benzodioxane which is then further purified by recrystallization using acetone-hexane as solvent.

By following the same procedure as above but using the corresponding 2-hydroxy-5-phenyl-benzyl alcohol starting materials, the following componds are respectively prepared:
  6-(4'-chlorophenyl)-2,2-dimethyl-1,3-benzodioxane;
  6-(4'-bromophenyl)-2,2-dimethyl-1,3-benzodioxane;
  6-(4'-iodophenyl)-2,2-dimethyl-1,3-benzodioxane;
  6-phenyl-2,2-dimethyl-1,3-benzodioxane;
  6-(4'-trifluoromethylphenyl)-2,2-dimethyl-1,3-benzodioxane;
  2,2-dimethyl-6-(4'-methylphenyl)-1,3-benzodioxane; and
  6-(4'-methoxyphenyl)-2,2-dimethyl-1,3-benzodioxane.

Similarly, by following the same procedure but using 1,1-dimethoxy cyclopentane in place of 2,2-dimethoxypropane, the following compounds are respectively prepared:
  6-(4'-fluorophenyl)-1,3-benzodioxane-2-spiro-cyclopentane;
  6-(4'-chlorophenyl)-1,3-benzodioxane-2-spiro-cyclopentane;

6-(4'-bromophenyl)-1,3-benzodioxane-2-spiro-cyclopentane;
6-(4'-iodophenyl)-1,3-benzodioxane-2-spiro-cyclopentane;
6-phenyl-1,3-benzodioxane-2-spiro-cyclopentane;
6-(4'-trifluoromethylphenyl)-1,3-benzodioxane-2-spiro-cyclopentane;
6-(4'-methylphenyl)-1,3-benzodioxane-2-spiro-cyclopentane; and
6-(4'-methoxyphenyl)-1,3-benzodioxane-2-spiro-cyclopentane.

Similarly, by following the same procedure but using 4-methyl-1,1-dimethoxy-cycloheptane in place of 2,2-dimethoxypropane, the following compounds are respectively prepared:

6-(4'-fluorophenyl)-1,3-benzodioxane-2-spiro-1'-(4'-methylcycloheptane);
6-(4'-chlorophenyl)-1,3-benzodioxane-2-spiro-1'-(4'-methylcycloheptane);
6-(4'-bromophenyl)-1,3-benzodioxane-2-spiro-1'-(4'-methylcycloheptane);
6-(4'-iodophenyl)-1,3-benzodioxane-2-spiro-1'-(4'-methylcycloheptane);
6-phenyl-1,3-benzodioxane-2-spiro-1'-(4'-methylcyclo-heptane);
6-(4'-trifluoromethylphenyl)-1,3-benzodioxane-2-spiro-1'-(4'-methylcycloheptane);
6-(4'-methylphenyl)-1,3-benzodioxane-2-spiro-1'-(4'-methylcycloheptane); and
6-(4'-methoxyphenyl)-1,3-benzodioxane-2-spiro-1'-(4'-methylcycloheptane).

EXAMPLE 12

This example illustrates methods for preparing O-alkyl alkanoic acid lactonium tetrafluoroborate compounds useful in the preparation of the compounds of formula IIIb of my invention. In this example, one gram of triethyloxonium tetrafluoroborate is dispersed in 5 ml. of dry methylene chloride under a nitrogen atmosphere. To the resultant mixture is added 0.45 ml. of butyric acid lactone while maintaining the anhydrous conditions. The resultant mixture is allowed to stand overnight at room temperature to provide a solution of O-ethyl butyric acid lactonium tetrafluoroborate.

In accordance with the foregoing procedure, the alkanoic acid lactones listed in Column A below are respectively reacted with each trialkyloxonium tetrafluoroborates listed in Column B below to provide the respective reagents listed under Column C below.

| Column A | ColumB |
|---|---|
| butyric acid lactone | trimethyloxonium tetrafluoroborate |
| pentanoic acid lactone | triethyloxonium tetrafluoroborate |
| hexanoic acid lactone | tri-n-propyloxonium tetrafluoroborate |
| heptanoic acid lactone | |

COLUMN C

O-methyl butyric acid lactonium tetrafluoroborate;
O-ethyl butyric acid lactonium tetrafluoroborate;
O-n-propyl butyric acid lactonium tetrafluoroborate;
O-methyl pentanoic acid lactonium tetrafluoroborate;
O-ethyl pentanoic acid lactonium tetrafluoroborate;
O-n-propyl pentanoic acid lactonium tetrafluoroborate;
O-methyl hexanoic acid lactonium tetrafluoroborate;
O-ethyl hexanoic acid lactonium tetrafluoroborate;
O-n-propyl hexanoic acid lactonium tetrafluoroborate;
O-methyl heptanoic acid lactonium tetrafluoroborate;
O-ethyl heptanoic acid lactonium tetrafluoroborate; and
O-n-propyl heptanoic acid lactonium tetrafluoroborate.

EXAMPLE 13

This example illustrates methods according to my invention of preparing the compounds of formula IIIb of my invention. In this example, 3.5 ml. of a solution of O-ethyl butyric acid lactonium tetrafluoroborate prepared according to Example 12 is added dropwise over a period of 10 minutes to a mixture of 2.18 g. of 5-(4'-fluorophenyl)-2-hydroxybenzyl alcohol and 2.8 ml. of anhydrous triethylamine in 25 ml. of anhydrous methylene chloride, at room temperature, with constant stirring. The resulting mixture is aged at room temperature (i.e., about 20°C) with constant stirring for 30 minutes, and then filtered through a column of alumina. The filtrate is then crystallized affording 6-(4'-phenyl)-1,3-benzodioxane-2-spiro-2'-tetrahydrofuran, which is then further purified by thin-layer chromatography.

By following the same procedure above but using the corresponding 2-hydroxy-5-phenyl-benzyl alcohol as starting materials, the following compounds are respectively prepared:

6-(4'-chlorophenyl)-1,3-benzodioxane-2-spiro-2'-tetrahydrofuran;
6-(4'-bromophenyl)-1,3-benzodioxane-2-spiro-2'-tetrahydrofuran;
6-(4'-iodophenyl)-1,3-benzodioxane-2-spiro-2'-tetrahydrofuran;
6-phenyl-1,3-benzodioxane-2-spiro-2'-tetrahydrofuran;
6-(4'-trifluoromethylphenyl)-1,3-benzodioxane-2-spiro-2'-tetrahydrofuran;
6-(4'-methylphenyl)-1,3-benzodioxane-2-spiro-2'-tetrahydrofuran; and
6-(4'-methoxyphenyl)-1,3-benzodioxane-2-spiro-2'-tetrahydrofuran.

Similarly, by following the same procedure but using O-methyl pentanoic acid lactonium tetrafluoroborate in place of of O-ethyl butyric acid lactonium tetrafluoride, the following compounds are respectively prepared:

6-(4'-fluorophenyl)-1,3-benzodioxane-2-spiro-2'-tetrahydropyran;
6-(4'-chlorophenyl)-1,3-benzodioxane-2-spiro-2'-tetrahydropyran;
6-(4'-bromophenyl)-1,3-benzodioxane-2-spiro-2'-tetrahydropyran;
6-(4'-iodophenyl)-1,3-benzodioxane-2-spiro-2'-tetra-hydropyran;
6-phenyl-1,3-benzodioxane-2-spiro-2'-tetrahydropyran;
6-(4'-trifluoromethylphenyl)-1,3-benzodioxane-2-spiro-2'-tetrahydropyran;
6-(4'-methylphenyl)-1,3-benzodioxane-2-spiro-2'-tetra-hydropyran; and
6-(4'-methoxyphenyl)-1,3-benzodioxane-2-spiro-2'-tetra-hydropyran.

Obviously many modifications and variations of the invention, described herein above and below, can be

What is claimed is:

1. A compound having the formula:

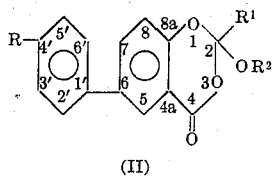

(II)

wherein R is selected from the group consisting of hydrogen, lower alkyl, lower alkoxy, fluoro, chloro, bromo, iodo, and trifluoromethyl; $R^1$ is selected from the group consisting of hydrogen and lower alkyl; and $R^2$ is lower alkyl.

2. The compound of claim 1 wherein R is selected from the group consisting of fluoro, chloro, and trifluoromethyl.

3. The compound of claim 1 wherein R is fluoro.

4. The compound of claim 1 wherein said compound is 2-ethoxy-6-(4'-fluorophenyl)-1,3-benzodioxan-4-one.

5. The compound of claim 1 wherein said compound is 6-(4'-chlorophenyl)-2-ethoxy-1,3-benzodioxan-4-one.

6. The compound of claim 1 wherein said compound is 2-ethoxy-6-(4'-fluorophenyl)-2-methyl-1,3-benzodioxan-4-one.

7. The compound of claim 1 wherein said compound is 6-(4'-chlorophenyl)-2-ethoxy-2-methyl-1,3-benzodioxan-4-one.

8. The compound of claim 1 wherein said compound is 2-ethoxy-6-(4'-trifluoromethylphenyl)-1,3-benzodioxan-4-one.

9. The compound of claim 1 wherein said compound is 2-ethoxy-6-phenyl-1,3-benzodioxan-4-one.

* * * * *